Sept. 9, 1952 A. SCHNÜRLE ET AL 2,609,802
TWO-STROKE CYCLE INTERNAL-COMBUSTION ENGINE
Filed April 5, 1949 8 Sheets-Sheet 4
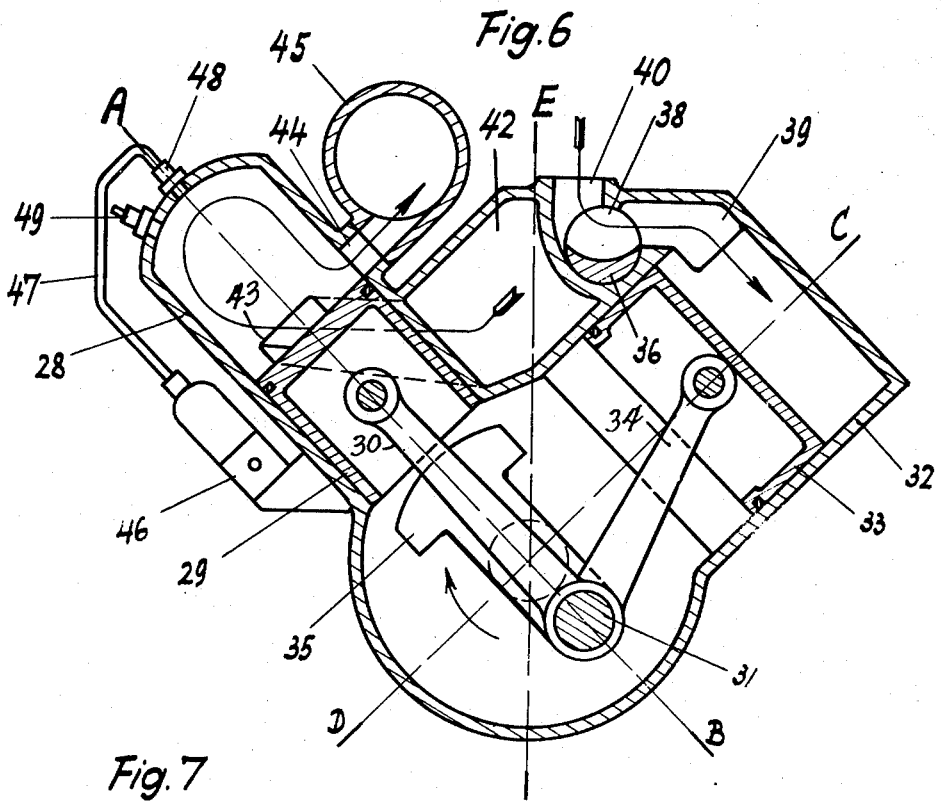
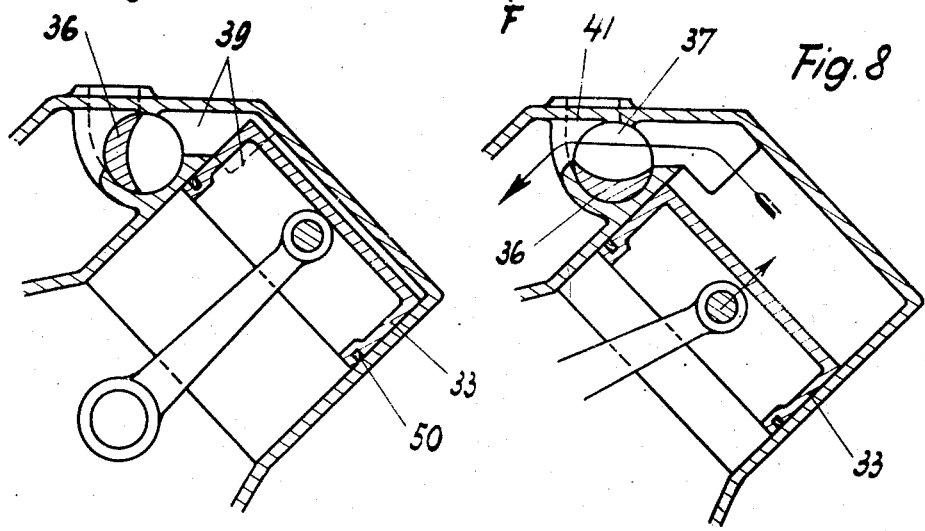
Witnesses:
Inventors:

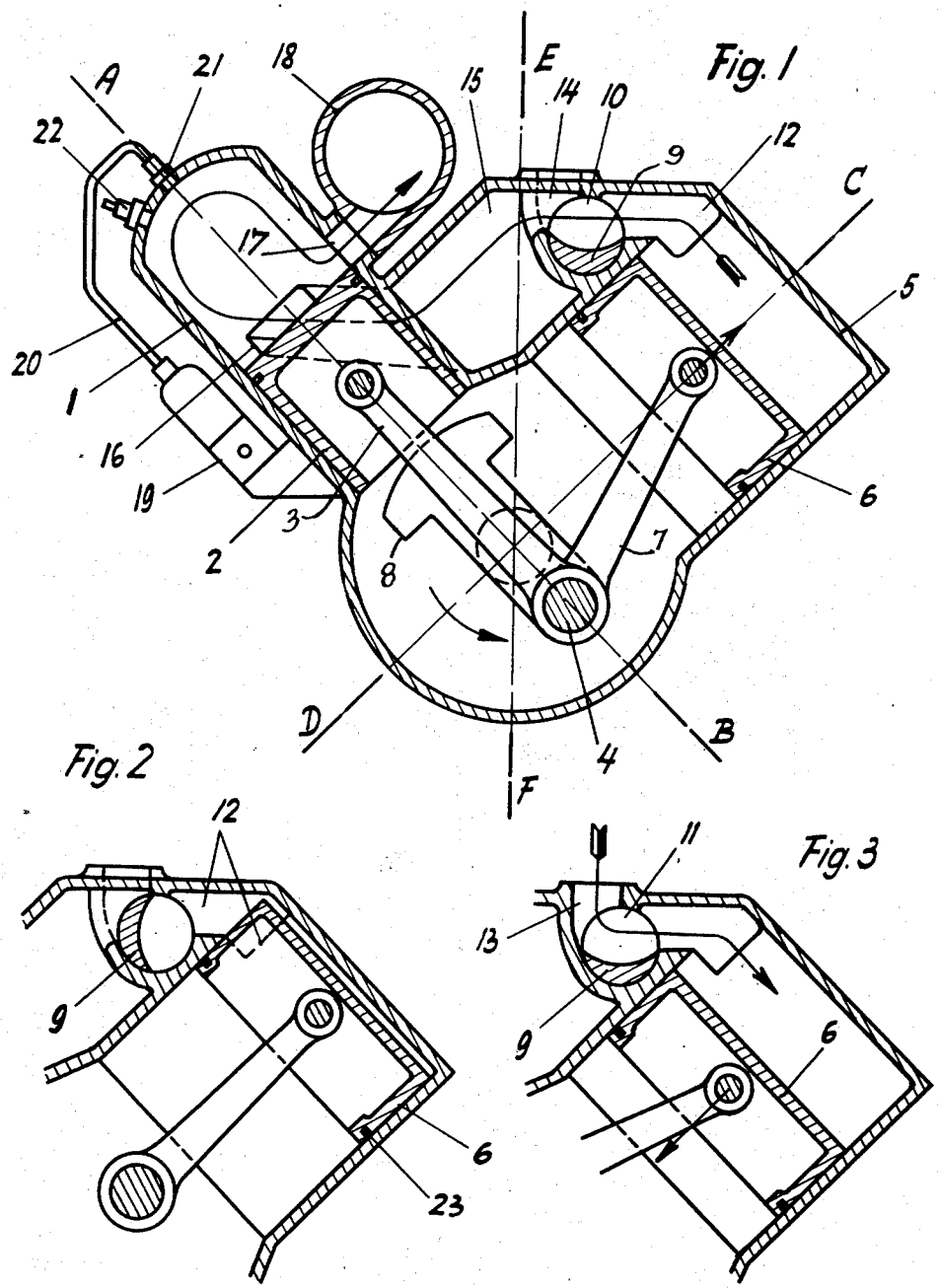

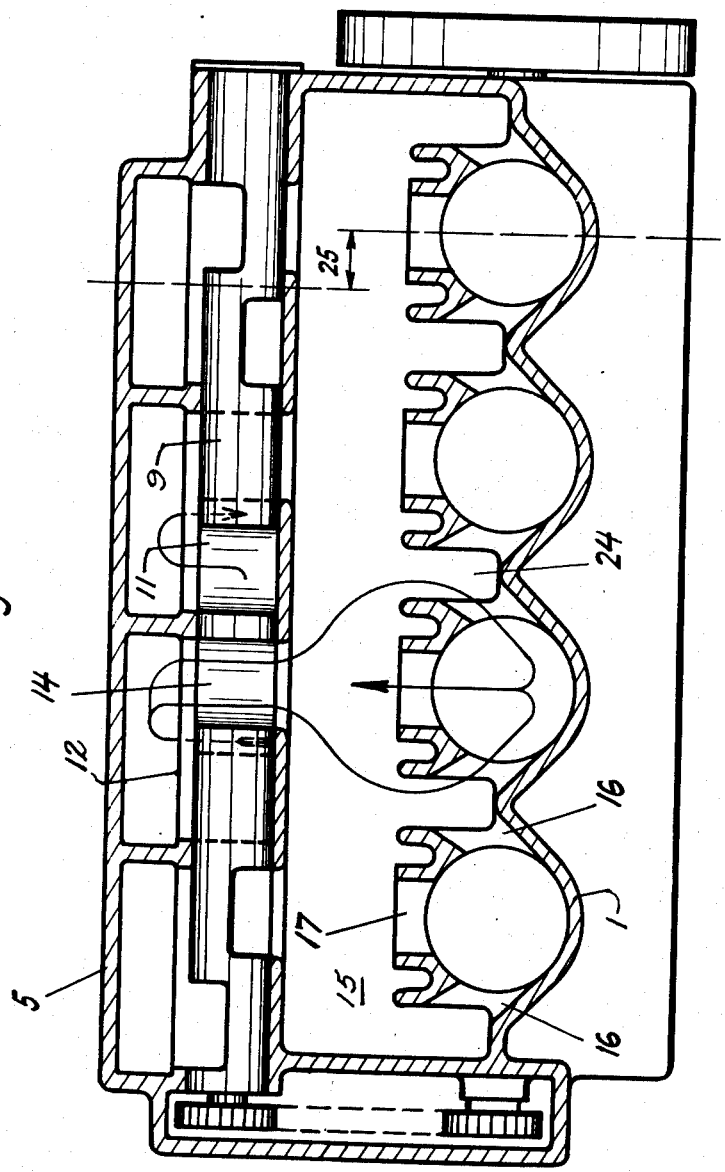

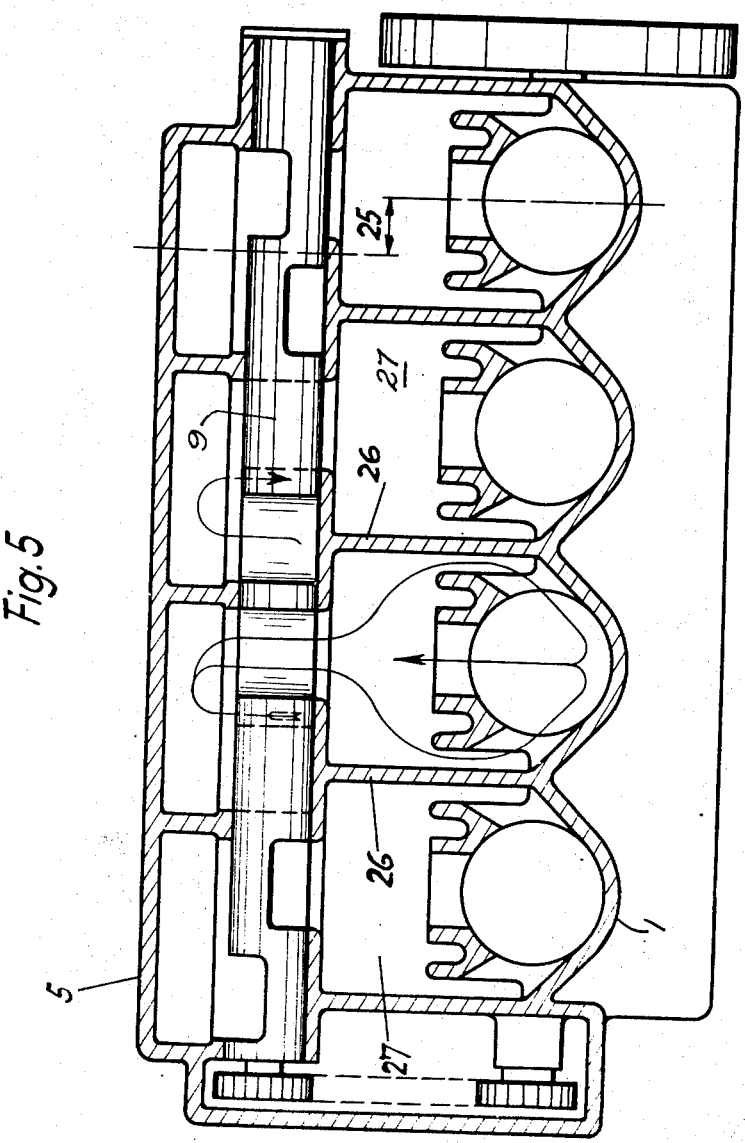

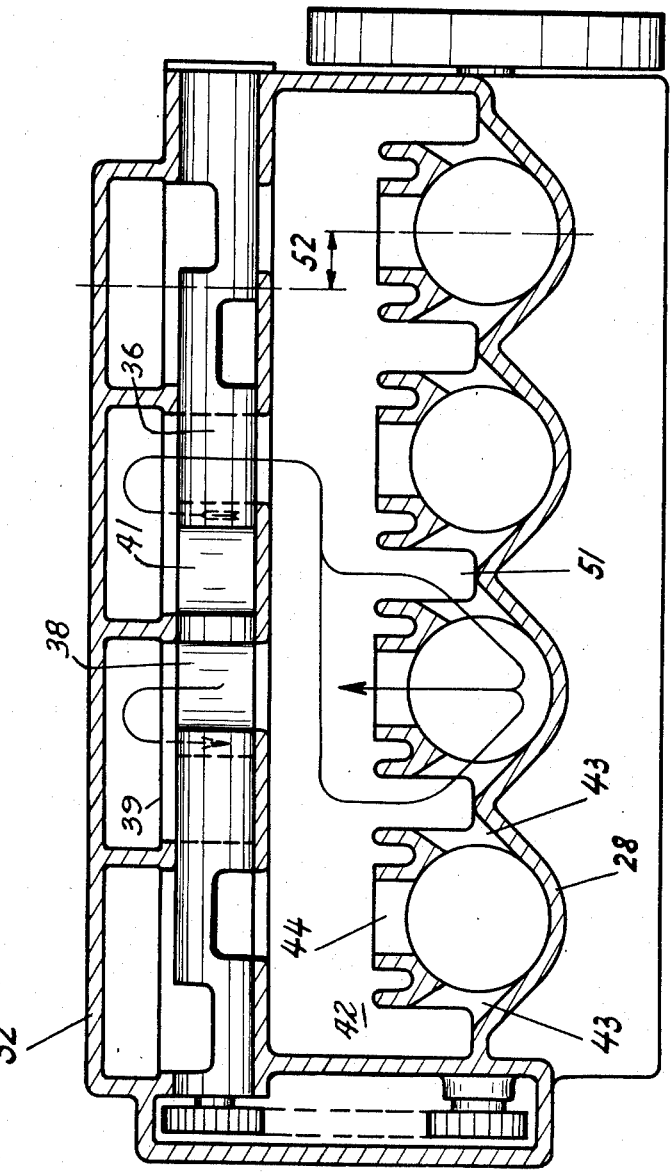

Patented Sept. 9, 1952

2,609,802

UNITED STATES PATENT OFFICE 2,609,802

TWO-STROKE CYCLE INTERNAL-COMBUSTION ENGINE

Adolf Schnürle and Otto Elwert, Stuttgart, Germany; said Elwert assignor to said Schnürle; Gertrud Schnürle, administratrix of said Adolf Schnürle, deceased Application April 5, 1949, Serial No. 85,493
In Germany October 1, 1948

7 Claims. (Cl. 123—72)

The present invention relates to two stroke cycle engines having several engine cylinders arranged in one bank; said engines being scavenged by air furnished by reciprocating pump. The invention particularly applies to high speed engines of the above type.

Air scavenged two stroke cycle engines require about double the amount of air as four stroke cycle engines of like output; the volume of scavenging air required per crankshaft revolution being approximately twice the piston displacement. This relatively large quantity of scavenging air makes it imperative to keep the scavenging air pressure as low as possible in order not to use too large a part of the engine output for supplying scavenging air. Due to the large volume of scavenging air required particular attention will have to be paid in two stroke cycle engines to the designing of the passages through which the air is ducted to the pump cylinder and from the pump cylinder to the engine cylinder and thence to the exhaust pipe. Large cross sectional areas of flow will have to be provided to keep the air velocity low and the pressure drop small. The passages will have to be as short and changes in curvature of the passages will have to be as gradual as possible to keep the frictional losses of the air flow to a minimum. It is the object of this invention to design a simple and compact two stroke cycle air scavenged engine without compromising the above referred to essential requirements for efficient air flow.

To conform to the above specifications V type two stroke cycle engines will—according to the invention—have (a) an equal number of engine and pump cylinders, the piston of each pump cylinder being actuated by a connecting rod fastened either to the crank pin of an engine piston connecting rod or to an eccentric of the crankshaft or in the manner of an articulated connecting rod to the connecting rod of the engine piston, and (b) a common cylindrical rotary valve for all pump cylinders which is mounted parallel to the crankshaft and extends the entire length of the pump cylinder bank, said cylindrical rotary valve governing the admittance of air into the pump cylinders as well as the discharge of the compressed scavenging air from the pump cylinders.

The invention further provides that the axes of the engine and pump cylinders are placed at a 90° angle relative to one another and intersect in the axis of the engine crankshaft. The scavenging air delivered by a pump cylinder can either enter a separate transfer passage, which passage can have such a large cross sectional area as to act as an individual receiver, or into a common receiver connected to all engine and all pump cylinders. Individual transfer passages respectively receivers can, however, be used for one direction of crankshaft rotation only, as will be explained in another part of this specification.

It is expedient to position the passages respectively, receivers or the common receiver in the space between the two banks of cylinders and preferably to cast them respectively integrally with the crankcase. In order to obtain a compact engine design and have as short as possible a path for the air flow between pump and engine cylinders, the rotary valve is preferably positioned near the pump cylinder wall facing the engine cylinders. The engine cylinders are scavenged according to the reverse loop method of scavenging providing for entry of scavenging air into the engine cylinders through scavenging ports located on both sides of the exhaust ports; the scavenging air being directed towards the side of the cylinder wall opposite the exhaust ports. The scavenging air is then deflected upwards towards the cylinder head, where it reverses its direction flowing towards the exhaust ports.

If scavenging and exhaust ports of the engine cylinders are of normal height, pump cylinders arranged at a 90° angle relative to the engine cylinders will at low and medium speeds supply a sufficient amount of scavenging air at the required slight pressure without utilizing the storage effect of the receiver to any great extent, as the momentary air delivery corresponds during the entire scavenging period rather closely to the momentary air requirements respectively to the port area uncovered by the engine piston. At high engine speeds, however, the receiver of an engine of the above type will have to supply scavenging air at higher pressure at the beginning of the scavenging period by utilizing air stored in said receiver during the previous compression stroke, thus preventing that any considerable quantity of burned gases can pop back into the receiver through the scavenging ports causing dilution and increased temperature of the scavenging air.

In engines with a separate receiver for each cylinder an equal quantity of air for each cylinder is assured, even if the exhaust ports or passages of some of the cylinders should be restricted by carbon formations, as in such cylinders with high back pressure the scavenging air pressure will also automatically rise.

If in multicylinder engines of this type the walls between the individual scavenging air receivers are dispensed with and all individual receivers are combined in one common receiver, the receiver efficiency is increased by the increase in storage capacity and differences in pressure are more easily equalized as all pump cylinders deliver into this common receiver. At high engine speeds each engine cylinder will, thus, receive a certain portion of air delivered by pump cylinders other than the one with which it is working in conjunction.

In two cylinder engines with a common receiver the scavenging pressure in a cylinder with high back pressure automatically rises, as the scavenging periods of the two cylinders do not overlap. This is also the case in three cylinder engines.

In 90° V engines of the above type the primary inertia forces of the reciprocating masses of the engine and pump cylinders can be fully balanced by crankshaft counterweights. These counterweights are preferably combined with the counterweights required for balancing the rotating masses, but also can be mounted separately.

If the intake and discharge of the air entering and leaving the pump cylinders is governed by a rotary valve, large cross sectional areas of flow can be provided for both intake and discharge. As the clearance space in the pump cylinders i. e. the space between the rotary valve and the pump piston in its top dead center position can be made relatively small, the quantity of reexpanding air is consequently small and the pressure rise quick resulting in high volumetric efficiency of the pump.

The short passage between the rotary valve and the pump cylinder connects preferably to a portion of the cylinder wall that is part of the piston travel, as this way the path of the scavenging air is shorter than it would be, if the passage would be connected to the cylinder head. In certain cases it might, however, be expedient to mount the rotary valve on top of the pump cylinders respectively cylinder heads.

Engine cylinders being scavenged according to the reverse loop method of scavenging as described above and having exhaust ports on the cylinder side that faces the scavenging pumps and the receiver have the advantage that the air flowing from the pump to the engine cylinder only undergoes minor changes of direction of flow, resulting in high scavenging efficiency and small frictional losses of air flow.

The accompanying drawings show several engine designs according to the present invention.

Fig. 1 shows a cross section of a two stroke cycle engine with a scavenging pump governed by a rotary valve. The pistons of the engine are in scavenging position. In the view shown the direction of crankshaft rotation is anti-clockwise.

Fig. 2 is a detail of Fig. 1 showing the scavenging pump piston at its top dead center position.

Fig. 3 is a cross sectional detail of an engine of the type shown in Fig. 1 with the pump piston on the intake stroke.

Fig. 4 is a longitudinal sectional view of a 4 cylinder engine of the type shown in Fig. 1; the cutting plane being passed through the engine cylinders, the common receiver and the supporting housing of the rotary valve. The rotary valve itself is shown in pictorial view.

Fig. 5 is a longitudinal sectional view of the engine shown in Fig. 1; this engine having an individual receiver for each pump cylinder.

Fig. 6 is a cross section of a multicylinder two stroke cycle engine with laterally arranged scavenging pump and rotary valve. The figure shows the engine during the scavenging period of the engine cylinder, the pump cylinder piston being on its intake stroke. In the view shown the crankshaft rotation is clockwise.

Fig. 7 is a detail of Fig. 6 with the pump piston in its top dead center position.

Fig. 8 is a cross sectional detail of the pump cylinder shown in Fig. 7, showing the pump piston during its compression stroke.

Fig. 9 is a longitudinal sectional view of a 4 cylinder engine according to Fig. 6; the cutting plane being passed as in Fig. 4.

Figure 10:
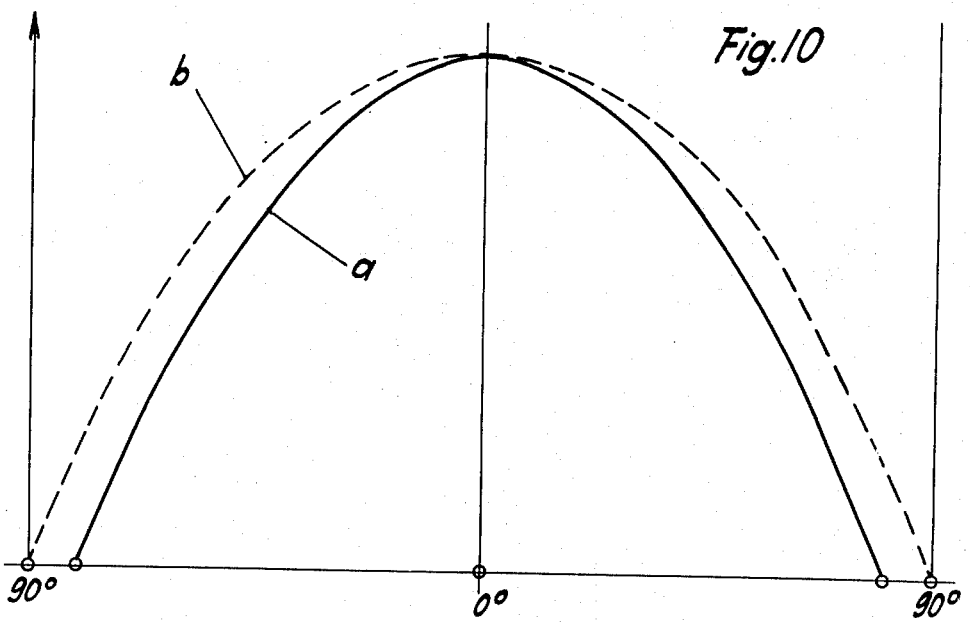

Fig. 10 is a diagram showing a curve of the scavenging port area uncovered by an engine piston as well as a curve showing the quantity of scavenging air delivered by the coordinated pump piston. Both curves are plotted against the crank travel.

Figure 11:
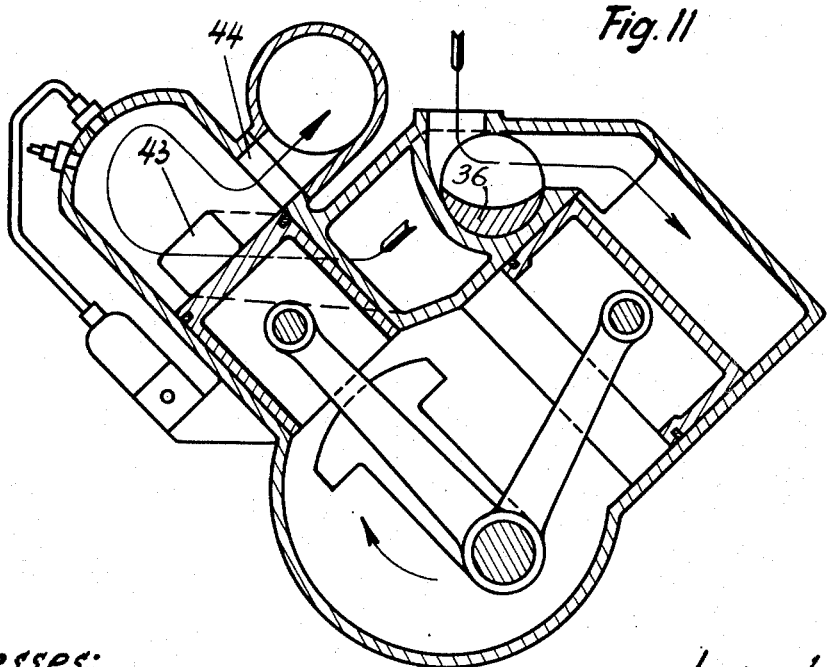

Fig. 11 is a cross section of an engine similar to that shown in Fig. 6. The height of the engine cylinder ports as well as the diameter of the rotary valve is larger than in the engine shown in Fig. 6.

Figure 12:
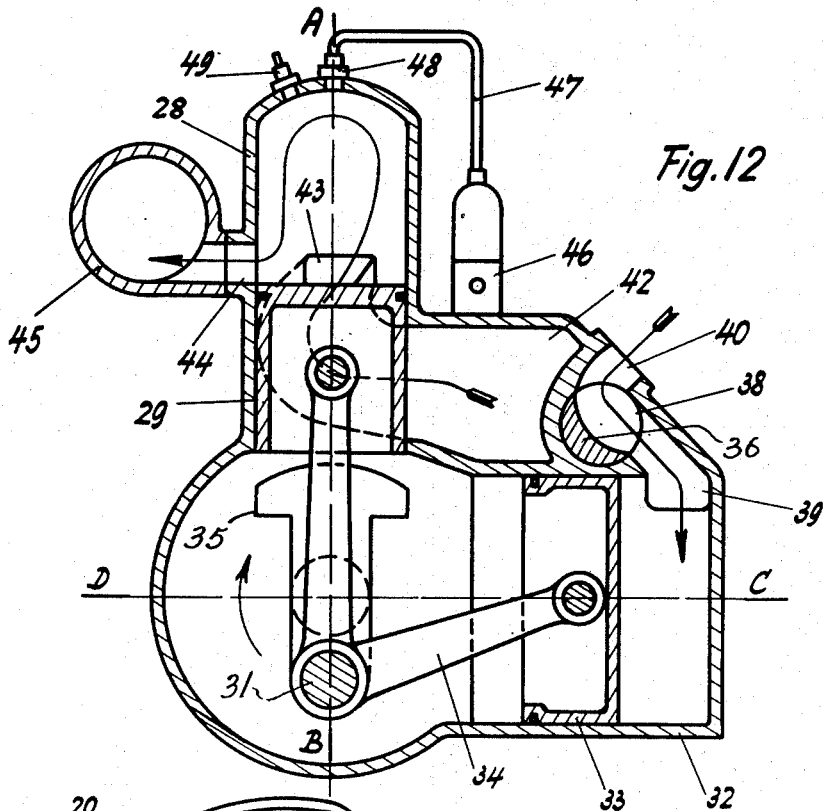

Fig. 12 is a cross section of a two stroke cycle engine with laterally arranged scavenging pump. The engine similar to the design shown in Fig. 6. The exhaust ports of the engine cylinder are here facing towards the outside of the engine. The engine cylinder is arranged perpendicularly and the pump cylinder horizontally.

Figure 13:
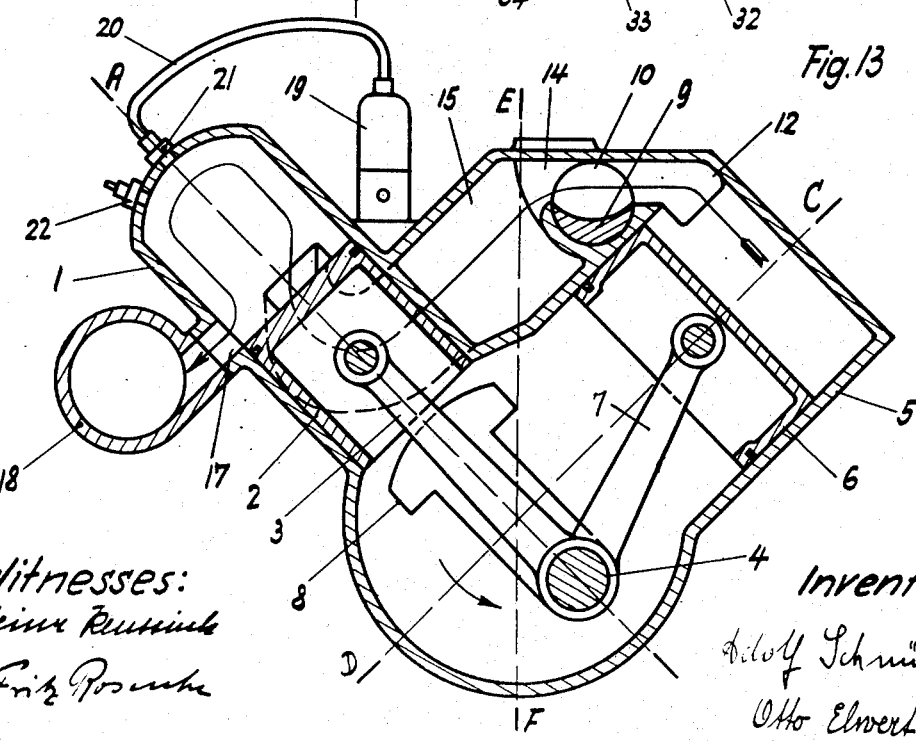

Fig. 13 is a cross section of a two stroke cycle engine similar to the design shown in Fig. 1. The exhaust ports of the engine cylinder are here facing towards the outside of the engine.

Figure 14:
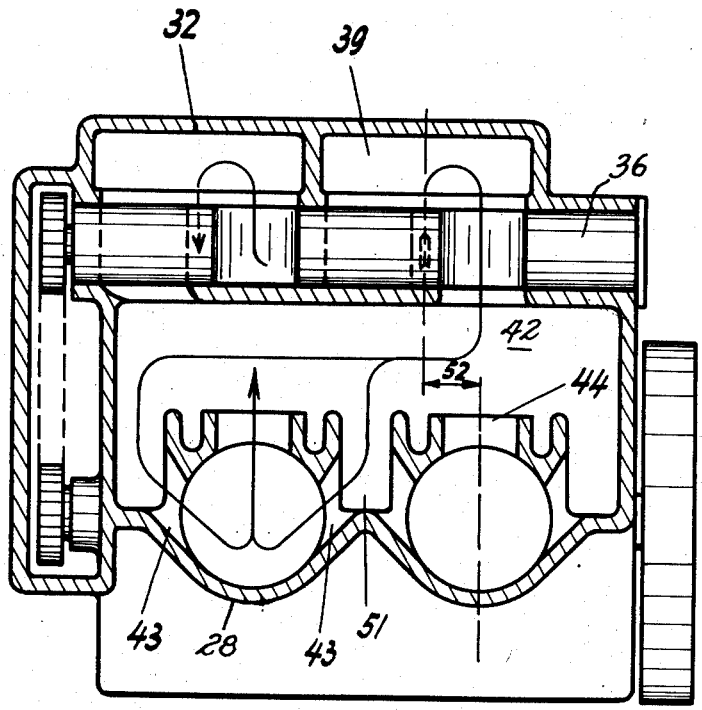

Fig. 14 is a longitudinal section of a two cylinder engine; the cutting plane being passed as in Fig. 4.

In the engine design shown in Figs. 1 to 4 the numeral 1 designates the engine cylinder, 2 the piston of the engine cylinder, 3 the connecting rod and 4 the crank pin. 5 is the pump cylinder, 6 the pump cylinder piston and 7 its connecting rod which is also fastened to the crank pin 4. A—B is the axis of the engine cylinder and C—D the axis of the pump cylinder. Both cylinder axes are arranged at a 90° angle relative to one another and intersect in the axis of the crankshaft. Both engine and pump cylinder axes are inclined 45° relative to the perpendicular with the engine mounted. In this position the width to the engine measured in a horizontal plane through the crankshaft is particularly small, so that it can be easily installed in vehicles having frames of relatively small width.

The counterweight 8 mounted opposite the crank pin 4 serves for balancing the rotating masses of the crankshaft and the reciprocating masses of the engine and pump cylinders. 9 is a cylindrical rotary valve for the pump cylinders mounted parallel to the crankshaft and extending alongside the pump cylinders 5. In this rotary valve two separate slots are cut side by side for each pump cylinder; the slot 11 serving as intake passage and the slot 10 serving as discharge passage for the scavenging air. The rotary valve of this engine design rotates at crankshaft speed and will work in both directions of rotation. Rotary valves of a different type from the one shown could, however, also be used, as for instance rotary valves turning at half crankshaft speed. Rotary valves of the latter type could for instance be slotted from both sides (having 4 slots instead of 2 for each cylinder). It is also possible to have a single passage cut through the valve for each cylinder, said passage governing both intake and discharge of the pump cylinder. This latter type valve would have to be driven by the engine crankshaft at the ratio 1:2.

The passage 12 connects the pump cylinder 5 to the rotary valve 9. It also acts as clearance space and, therefore, should be made as small as possible. 13 is the air intake opening in the rotary valve support and 14 the passage leading from the rotary valve to the receiver 15. In Fig. 1 one of the two scavenging ports 16, which are located on both sides of the exhaust port 17, are shown. The exhaust port 17 is here facing towards the pump cylinder resp. the receiver. Owing to the 45° inclination of the engine cylinders relative to the perpendicular the exhaust port 17 is slanted upwards at a 45° angle, which has the advantage that the lubricating oil carried through the ports by the exhaust gases or scraped into the port by the piston rings can flow back into the engine cylinder.

18 is the exhaust manifold located in the space between the two cylinder banks.

In the crankshaft position shown in Fig. 1 the engine piston 2 is in its bottom dead center position and the ports 16 and 17 are fully uncovered. With the crankshaft rotation as indicated the pump piston is coming up on its compression stroke as shown by the arrow.

The path of the scavenging air from the pump cylinder through the rotary valve, the receiver and the engine cylinder into the exhaust manifold which is indicated in Figs. 1 and 4 by an arrow, shows that the scavenging air when flowing from the pump cylinder into the engine cylinder undergoes only relatively small changes in direction.

With the crankshaft rotating in the indicated direction the oil splash from the crankshaft will be directed towards the left side of the cylinder wall i. e. the side of the cylinder wall having no exhaust ports. The reciprocating action of the engine piston will, therefore, only scrape a relatively small quantity of lubricating oil passed respectively into the exhaust ports.

In Fig. 1 the numeral 19 designates the fuel pump, 20 the line from the fuel injection pump to the injection nozzle 21. 22 is a spark plug. An engine of the design shown can operate either as a diesel engine or as an engine with air scavenging and gasoline injection. In the latter case changes in engine load will be compensated by changing the quantity of both fuel and air. Changes in the quantity of air admitted can be effected by throttle or blow-off valves in the scavenging air supply system. The engine design shown in Fig. 1 can also be used in one cylinder engines.

In Fig. 2 which is a detail drawing of Fig. 1, the pump piston 6 is in its top dead center position at the end of the compression stroke respectively at the beginning of the suction stroke. Both intake and discharge passages are closed by the rotary valve 9. The passage 12 is nearly entirely closed up by the pump piston. As there is very little clearance between pump piston and cylinder head, the pump cylinder clearance space practically consists only of the passage 12. Connecting the passage 12 laterally to the cylinder results in a shorter scavenging air path with less changes in direction compared to a design in which this passage connects to the top of the pump cylinder. The pump piston has a compression ring at the lower end of its skirt. This piston ring can also serve as an oil control ring.

In the detail shown in Fig. 3 the pump piston 6 and the rotary valve 9 are shown during the intake stroke of the pump. The path of the outside air through the intake opening 13 and the rotary valve slot 11 into the pump cylinder is indicated by an arrow. In order to allow for reexpansion of the air trapped in the clearance space, the rotary valve opens somewhat after top dead center of the pump piston. Fig. 4 shows a longitudinal section of a 4 cylinder engine. The numeral 1 designates the 4 engine cylinders, the cutting plane of the engine cylinders being passed through the exhaust ports 17 and the scavenging ports 16. 5 are the four pump cylinders, the cutting plane of the pump cylinders being passed through the support of the rotary valve. In engines with the direction of crankshaft rotation as shown in Fig. 1 the path of the scavenging air from a pump cylinder to an engine cylinder is straight across the receiver 15, as the scavenging air is furnished each engine cylinder by the pump piston linked to the crank pin of the respective engine cylinder. 24 are pockets extending from the receiver and connecting to the exhaust ports of one respectively of two adjacent cylinders. 25 indicates the distance of offset of the engine cylinders relative to the pump cylinders resulting from fastening the connecting rods of an engine and a pump cylinder side by side to the same crank pin.

If in one or multicylinder engines a sufficiently large passage is provided for the flow of scavenging air from the pump cylinder to the scavenging ports on both sides of the engine, this passage will in itself act as a receiver due to its large cubic capacity. In Fig. 5 the common receiver has been partitioned into separate receivers, each of these separate receivers serving one pair of coordinated engine and pump cylinders. Such a partitioning can be of advantage in certain cases as already mentioned further above. Separate receivers can also be designed in such a way as to act as diffusers.

In engines with separate receivers the direction of the crankshaft rotation must be as shown in Fig. 1 i. e. the crankshaft must rotate in such a way that the pump piston is coming up on its compression stroke when the engine piston starts to uncover the scavenging and exhaust ports.

In all engine design shown in the accompanying drawings it is expedient to make the stroke of the engine piston as well as the stroke of the pump piston equal or smaller than the bore diameter of the engine cylinder. Short stroke engines of the above type are particularly suited for operation at high speeds. The overall width of the engine is reduced by using a large bore stroke ratio. Furthermore the path of the scavenging air from the pump cylinder to the scavenging ports of the engine cylinder is shorter in short stroke engines, resulting in lower frictional losses of scavenging air flow.

The two stroke cycle engine shown in Figs. 6 to 9 is a 90° V type engine of the same general type as previously described. An equal number of engine and pump cylinders are arranged in separate banks. The crank pins of each cylinder pair consisting of an engine cylinder and the pump cylinder located nearest to said engine cylinder are fastened to the same crank throw. The crankshaft of the engine rotates in such a direction that with a pump piston coming up on its compression stroke an engine cylinder other than the one, the connecting rod of which is fastened to the same crank throw, is being scavenged. Thus, each pump cylinder is furnishing scavenging air to one or several engine cylinders other than the one, the connecting rod of which is fastened to the same crank throw as the pump cylinder connecting rod is.

In the Figs. 6 to 9 the numeral 28 designates the engine cylinder, 29 the engine piston, 30 the connecting rod of the engine piston and 31 the crank pin. 32 is the pump cylinder, 33 the pump piston and 34 the connecting rod of the pump piston. A—B is the axis of the engine cylinder and C—D the axis of the pump cylinder. These axes form a 90° angle and intersect in the axis of the crankshaft. The axes of the engine and pump cylinders are inclined 45° relative to the perpendicular E—F. 35 are crankshaft counterweights for balancing the inertia forces of the rotating and reciprocating masses of the engine. 36 is the cylindrical rotary valve extending alongside all pump cylinders. The rotary valve has two adjacent slots for each pump cylinder, of which the slot 37 governs the discharge of scavenging air from the pump cylinder into the receiver and 38 the entry of the outside air. The rotary valve rotates at crankshaft speed. 39 is the passage leading from the pump cylinder to the rotary valve. The passage 39 also serves as clearance space and, therefore, has to be as short as possible. 40 is the intake opening for the outside air. 41 is the discharge passage from the rotary valve into the receiver 42. 43 is one of the scavenging ports, which are located on both sides of the exhaust port 44 of the engine cylinder. The exhaust port is located on the receiver side of the engine cylinder and is slanting upward at a 45° angle. 45 is the exhaust manifold located above the receiver in the space between the two cylinder banks.

The piston of the engine cylinder is shown in its bottom dead center position in Fig. 6. The scavenging and exhaust ports are fully uncovered and scavenging is taking place. The pump piston is moving downwards on its suction stroke as indicated by an arrow.

The path of the scavenging air from the pump cylinder through the rotary valve, the receiver and the engine cylinder into the exhaust manifold is indicated by arrows.

46 in Fig. 6 is the fuel injection pump. 47 the fuel line to the injection nozzle 48. 49 is a spark plug.

An engine of the above described designs can either be operated as a diesel engine or as an engine with air scavenging and gasoline injection. If operated with gasoline injection the quantities of both fuel and scavenging air will have to be changed in case of changes in engine load. Changes in the quantity of scanvenging air admitted into the engine cylinder can be effected by throttling or by by-passing part of the scavenging air from the pressure to the suction side of the pump cylinder.

In the detail shown in Fig. 7 the pump piston 33 is in its top dead center position. The rotary valve 36 is in such a position that no connection exists between the pump cylinder and the receiver or between the pump cylinder and the outside air. The passage 39 connects laterally to the wall of the pump cylinder. The cylinder wall port of the passage 39 is nearly fully covered with the pump piston at top dead center. It is preferable to connect the passage 39 laterally to the cylinder wall instead of connecting it to the cylinder head, as the path of air flow from the pump cylinder to the receiver is shorter in this case. The piston ring on the lower part of the piston skirt is still below the passage 39 when the pump piston is in its top dead center position.

In the sectional detail shown in Fig. 8 the pump piston 33 is coming up on its compression stroke. The path of the scavenging air through the slot 37 of the rotary valve and the passage 41 in the rotary valve support is indicated by an arrow. The inlet slot of the rotary valve is here also opening later than top dead center of the pump piston, in order to utilize the reexpansion of the air trapped in the clearance space.

Fig. 9 shows a longitudinal sectional view of a four cylinder engine. The numeral 28 designates the engine cylinders; the cutting plane through the engine cylinders being passed through the scavenging ports 43 and the exhaust ports 44. 32 are the pump cylinders. 42 is the common receiver for all cylinders. The direction of crankshaft rotation is the same as indicated in Fig. 6. The paths of the scavenging air from the individual pump cylinders to the engine cylinders are of different lengths, as each engine cylinder is supplied scavenging air by a pump cylinder other than the one, the connecting rod of which is fastened to the crank throw of the connecting rod of this respective engine cylinder. 51 are pockets extending from the receiver 42 and connecting to the scavenging ports 43 of the engine cylinders. Those of the pockets 51 that extend between two cylinders serve adjacent scavenging ports of these two cylinders. 52 is the distance the engine cylinder bank is offset relative to the pump cylinder bank, if the connecting rods of an engine cylinder and a pump cylinder are fastened side by side to the same crank pin.

The engine design shown in Figs. 6 to 9 is particularly suitable for high speed engines of high output, as—with the direction of crankshaft rotation as indicated and with exhaust ports located on the side of the engine cylinders facing the receiver—the oil splash of the crankshaft is directed towards the hot exhaust side of the engine cylinder, thereby adequately lubricating said side of the engine cylinder. The piston thrust during the power stroke is directed towards the side opposite the exhaust ports i. e. the cylinder side without any ports. In the pump cylinders most of the oil splash is directed towards the cylinder side opposite the passage 39. The scavenging air, therefore, is practically free from lubricating oil.

To keep the overall width of the engine as small as possible the pump cylinder connecting rods are shorter than the engine cylinder connecting rods. This applies to all engine designs described in this specification.

In the curve a of Fig. 10 the portion of scavenging port area, that is uncovered by the engine piston during the scavenging interval, is plotted against crank travel. The height of the scavenging ports, measured parallel to the cylinder axis, is here 35% of the stroke of the engine piston. The broken curve b shows quantity of scavenging air delivered during the same time interval by the pump piston working in conjunction with above engine piston. The conformity of the two curves is notable.

Fig. 11 shows a similar engine to that of Fig. 6. The scavenging ports 43 have a height of 35% and the exhaust ports 44 of 45% of the stroke of the engine piston. The diagrams of Fig. 10 apply to an engine of this type. As large as possible cross sectional areas of flow are provided for the scavenging air and the exhaust gases.

The diameter of the rotary valve is larger than in the designs previously described. Scavenging efficiencies of engines of the described designs increase considerably, if the height of scavenging ports equals or exceeds 28% and the height of the exhaust ports 35% of the stroke of the engine piston. Higher scavenging efficiency results in less power being required for the operation of the scavenging pump and consequently in lower fuel consumption. This also applies to reversible engines of this type when operating at reversed direction of crankshaft rotation.

The engine cylinder exhaust ports of an engine of the design shown in Fig. 6 can also be located on the engine cylinder side facing outside i. e. away from the V angle. An engine of such a design is shown in Fig. 12. Like engine parts are designated in Fig. 12 by the same numerals as used in Fig. 6. In variance with the design shown in Fig. 6 the pump cylinders are here arrranged horizontally and the engine cylinders perpendicularly. The main advantage of the engine design shown in Fig. 12 as compared to the design shown in Fig. 6 is, that with the direction of crankshaft rotation as indicated the oil splash of the rotating crankshaft will be directed towards the side of the cylinder wall located opposite the exhaust ports, so that no lubricating oil can be carried out the exhaust ports by the exhaust gases. The design shown in Fig. 12 is, therefore, especially suitable for low speed engines, which require less splash oil for lubricating the exhaust port side of the engine cylinder wall. With the exhaust manifold outside the V angle the space between the cylinders can be used for the fuel injection pump and other accessories. Transfer of heat from the exhaust manifold 45 to the scavenging air is avoided by placing this manifold outside the V angle. In this engine design special attention has to be paid to the design of the scavenging air passage leading from the receiver to the scavenging ports of the engine cylinder, as the flow of scavenging air has to be sharply diverted in this passage.

In two stroke cycle engines with the direction of crankshaft rotation as indicated in Fig. 1 exhaust ports of the engine cylinders and the exhaust manifold can also be located on the outside of the engine (as shown in Fig. 13), so that accessories can be mounted in the space between the two cylinder banks. Equal parts are designated in Fig. 13 by numerals used in Fig. 1.

Fig. 14 is a longitudinal sectional view of a two cylinder two stroke cycle engine incorporating the various features of this invention and constituting an efficient small type multipurpose engine. The crank throws will have to be 180 degrees apart in order to obtain a firing order with equally spaced power impulses. With the direction of crankshaft rotation as indicated in Fig. 6 separate scavenging air passages from the receiver to the scavenging ports would have to cross each other or, if a common receiver is used, the paths of consecutive charges of scavenging air would cross each other in the receiver. Each pump cylinder would then supply scavenging air to the engine cylinder, which is farthest away from it.

In Fig. 14 equal parts are designated with the numerals used in Fig. 6. 28 are the two engine cylinders, the cutting plane through these cylinders being passed through the scavenging ports 43 and the exhaust ports 44. 32 designates the pump cylinders as well as the support of the rotary valve. 42 is a common receiver for all cylinders. The path of the scavenging air from the pump to the engine cylinder crosses the receiver diagonally. 51 are the passages from the receiver to the scavenging ports of the engine cylinders. 52 is the distance the engine cylinder bank is offset relative to the pump cylinder bank, if the connecting rods of an engine cylinder and a pump cylinder are fastened side by side to the same crank pin. With the direction of crankshaft rotation remaining unchanged and with the paths of consecutive scavenging air charges crossing each other it would also be possible to locate the exhaust manifold on the outside of the engine.

Engines of the above type can operate on as diesel engines or as engines with air scavenging, gasoline injection and spark ignition.

What we claim is:

1. In a two stroke cycle V type engine with several air scavenged engine cylinders in one bank the following combination: a bank of pump cylinders, the piston of each pump cylinder being connected to the crank pin of an engine cylinder; the axes of the engine and pump cylinders intersecting in the axis of the crankshaft and forming a 90° angle relative to one another; a cylindrical rotary valve mounted parallel to the crankshaft and extending alongside the pump cylinder bank, said rotary valve governing the admittance of air into the pump cylinders as well as the discharge of compressed scavenging air from the pump cylinders; the engine crankshaft rotating in such a direction that the pump piston is on its upstroke when the engine piston, to the crank pin of which it is connected, is in its scavenging position, so that each pump piston supplies scavenging air either through an individual passage or straight across the common receiver to the engine cylinder, to the crank pin of which it is connected.

2. In a two stroke cycle V type engine with several air scavenged engine cylinders in one bank the following combination: a bank of pump cylinders, the piston of each pump cylinder being connected to the crank pin of an engine cylinder; the axes of the engine and pump cylinders intersecting in the axis of the crankshaft and forming a 90° angle relative to one another; a cylindrical rotary valve mounted parallel to the crankshaft and extending alongside the pump cylinder bank, said rotary valve governing the admittance of air into the pump cylinders as well as the discharge of compressed scavenging air from the pump cylinders; the engine crankshaft rotating in such a direction that the pump piston is on its upstroke when the engine piston, to the crank pin of which it is connected, is in its scavenging position, so that each pump piston supplies scavenging air either through an individual passage or straight across the common receiver to the engine cylinder, to the crank pin of which it is connected; the engine cylinders being scavenged according to the reverse loop scavenging method and having scavenging ports on both sides of the exhaust ports, the scavenging air being directed towards the side of the cylinder wall opposite the exhaust ports, said exhaust ports facing towards the pump cylinder bank; the exhaust manifold being located between the two banks; the flow of scavenging air only undergoing minor changes of direction in its path from the pump cylinders through the rotary valve, through the receiver and through the scavenging ports to the engine cylinder wall opposite the exhaust ports.

3. In a two stroke cycle V type engine with several air scavenged engine cylinders in one bank the following combination: a bank of pump cylinders, the piston of each pump cylinder being connected to the crank pin of an engine cylinder; the axes of the engine and pump cylinders intersecting in the axis of the crankshaft and forming a 90° angle relative to one another; a cylindrical rotary valve mounted parallel to the crankshaft and extending alongside the pump cylinder bank, said rotary valve governing the admittance of air into the pump cylinders as well as the discharge of compressed scavenging air from the pump cylinders into a receiver serving all engine cylinders; the engine crankshaft rotating in such a direction that a pump piston is on its upstroke when an engine piston other than the one, to the crank pin of which it is connected, is in its scavenging position, so that each pump piston supplies scavenging air through the common receiver to one or several engine cylinders other than the one, to the crank pin of which it is connected; the engine cylinders are being scavenged according to the reverse loop scavenging method, scavenging ports being provided on both sides of the exhaust ports and the flow of scavenging air being directed towards the side of the cylinder wall opposite the exhaust ports, said exhaust ports being located on the cylinder side facing away from the V angle, said location of the exhaust ports reducing the amount of lubricating oil carried out through the exhaust ports.

4. In a two stroke cycle V type engine with several air scavenged engine cylinders in one bank the following combination: a bank of pump cylinders, the piston of each pump cylinder being connected to the crank pin of an engine cylinder; the axes of the engine and pump cylinders intersecting in the axis of the crankshaft and forming a 90° angle relative to one another; a cylindrical rotary valve mounted parallel to the crankshaft and extending alongside the pump cylinder bank, said rotary valve governing the admittance of air into the pump cylinders as well as the discharge of compressed scavenging air from the pump cylinders; the engine crankshaft rotating in such a direction that the pump piston is on its upstroke when the engine piston, to the crank pin of which it is connected, is in its scavenging position, so that each pump piston supplies scavenging air either through an individual passage or straight across the common receiver to the engine cylinder, to the crank pin of which it is connected; the engine cylinders being scavenged according to the reverse loop scavenging method, scavenging ports being provided on both sides of the exhaust ports and the flow of scavenging air being directed towards the side of the cylinder wall opposite the exhaust ports, said exhaust ports being located on the cylinder side facing away from the V angle, the exhaust manifold thus not being located in the space between the two cylinder banks leaving this space free for mounting engine accessories.

5. In a two stroke cycle V type engine with several air scavenged engine cylinders in one bank the following combination: a bank of pump cylinders, the piston of each pump cylinder being connected to the crank pin of an engine cylinder; the axes of the engine and pump cylinders intersecting in the axis of the crankshaft and forming a 90° angle relative to one another; a cylindrical rotary valve mounted parallel to the crankshaft and extending alongside the pump cylinder bank, said rotary valve governing the admittance of air into the pump cylinders as well as the discharge of compressed scavenging air from the pump cylinders into a receiver serving all engine cylinders; the engine crankshaft rotating in such a direction that a pump piston is on its upstroke when an engine piston other than the one, to the crank pin of which it is connected, is in its scavenging position, so that each pump piston supplies scavenging air through the common receiver to one or several engine cylinders other than the one, to the crank pin of which it is connected; the engine cylinders being scavenged according to the reverse loop scavenging method, scavenging ports being provided on both sides of the exhaust ports and the flow of scavenging air being directed towards the side of the cylinder wall opposite the exhaust ports, said exhaust ports being located on the cylinder side facing the pump cylinders so that the oil splash of the crankshaft copiously lubricates the hot exhaust side of the engine cylinders in engines of high output but does not hit the discharge side of the pump cylinder wall, the scavenging air thus being relatively free from lubricating oil.

6. In a two cylinder V type two stroke cycle engine the following combination: two pump cylinders, the piston of each pump cylinder being connected to the crank pin of an engine cylinder, the axes of the engine and pump cylinders intersecting in the axis of the crankshaft and forming a 90° angle relative to one another; a cylindrical rotary valve mounted parallel to the crankshaft and extending alongside the pump cylinders, said rotary valve, which governs the flow of air to and from the pump cylinders, being located on the side of the pump cylinders which is facing the engine cylinders; two passages leading from the rotary valve to the engine cylinders, said passages crossing one another.

7. In a two cylinder V type two stroke cycle engine the following combination: two pump cylinders, the piston of each pump cylinder being connected to the crank pin of an engine cylinder, the axes of the engine and pump cylinders intersecting in the axis of the crankshaft and forming a 90° angle relative to one another; a cylindrical rotary valve mounted parallel to the crankshaft and extending alongside the pump cylinders, said rotary valve, which governs the flow of air to and from the pump cylinders, being located on the side of the pump cylinders which is facing the engine cylinders; a common receiver for the scavenging air; the paths of scavenging air from a pump cylinder to an engine cylinder crossing each other in said common receiver.

ADOLF SCHNÜRLE.
OTTO ELWERT.

REFERENCES CITED

The following references are of record in the file of this patent:

UNITED STATES PATENTS

| Number | Name | Date |
|---|---|---|
| 956,405 | Nichols | Apr. 26, 1910 |
| 1,093,176 | Fruh | Apr. 14, 1914 |
| 1,623,391 | Burtnett | Apr. 5, 1927 |
| 1,802,382 | Hunter | Apr. 28, 1931 |
| 2,220,661 | Ricardo | Nov. 5, 1940 |
| 2,288,017 | Neuland | June 30, 1942 |

FOREIGN PATENTS

| Number | Country | Date |
|---|---|---|
| 377,124 | Great Britain | 1932 |